F. C. WARNE & A. B. McLEAN.
HARROW.
APPLICATION FILED OCT. 22, 1908.
958,200.
Patented May 17, 1910.
2 SHEETS—SHEET 1.
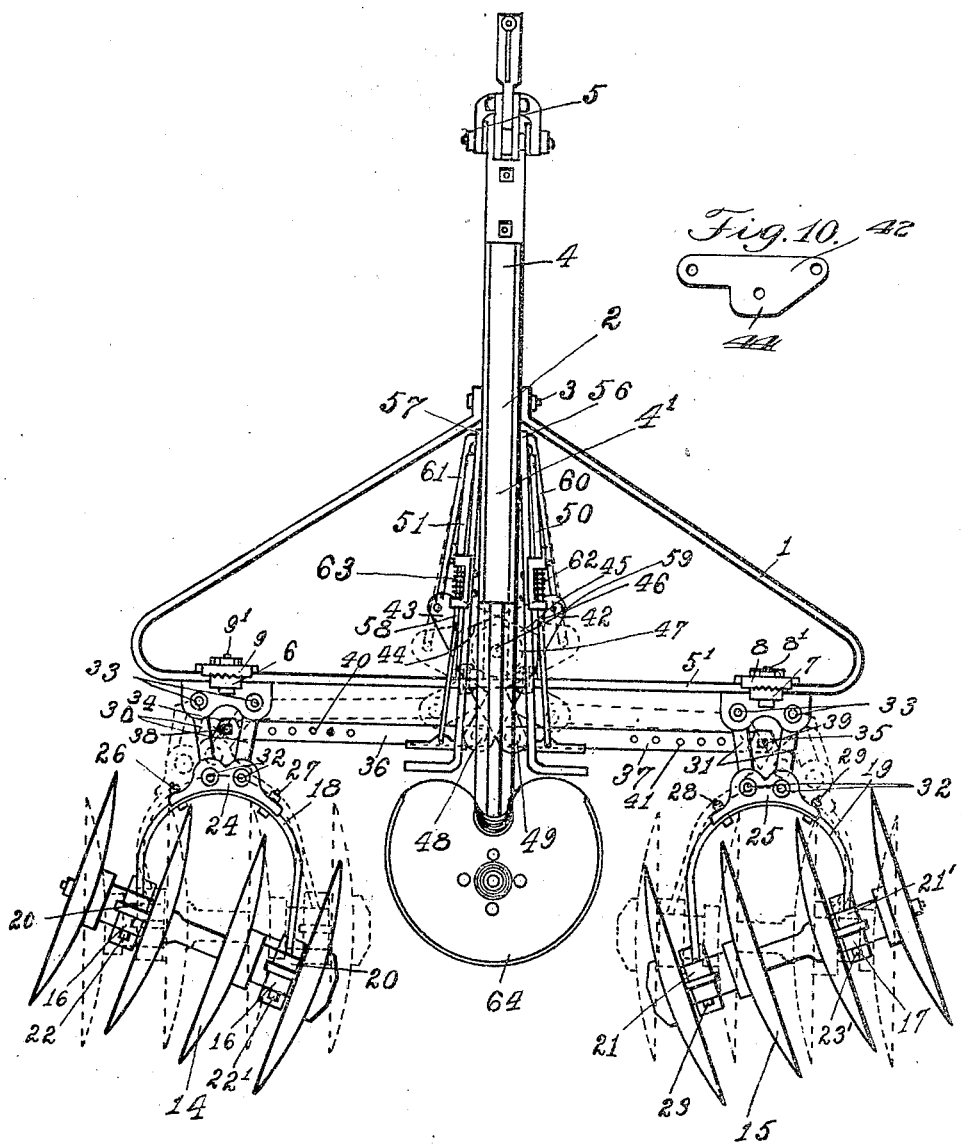
Witnesses
Fred A. Schlosser.
Frank Jamison
Inventors
Andrew B. McLean
and
Frederick C. Warne
By John H. Coss
Their Attorney F. C. WARNE & A. B. McLEAN.
HARROW.
APPLICATION FILED OCT. 22, 1908.
958,200.
Patented May 17, 1910.
2 SHEETS—SHEET 2.
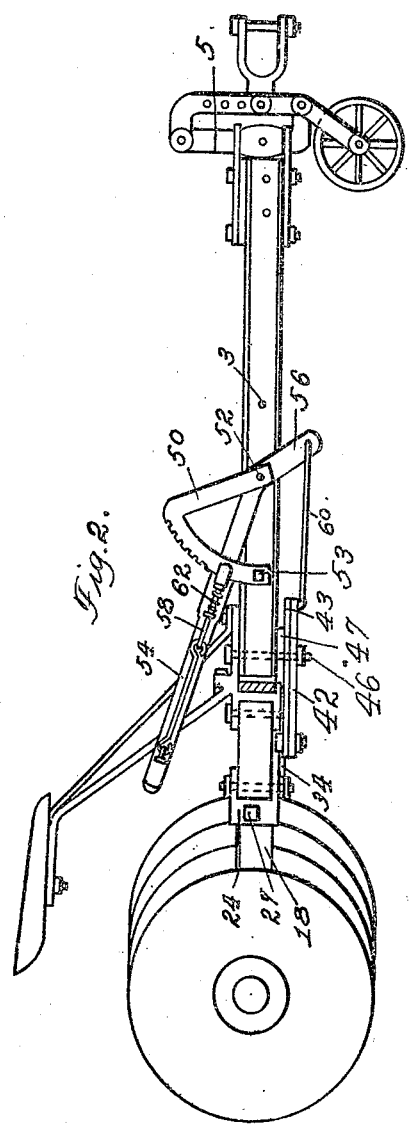
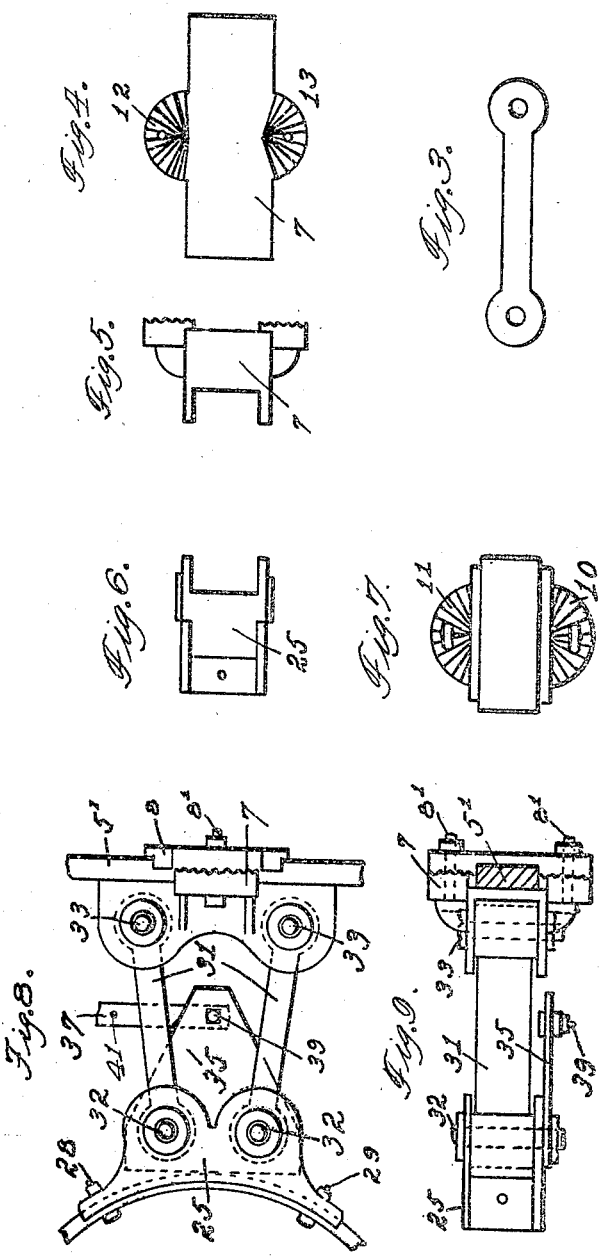
Witnesses
Fred A. Schlosser.
Frank Jamison
Inventors
Andrew B. McLean
and
Frederick C. Warne
By John H. Boos their Attorney

UNITED STATES PATENT OFFICE.

FREDERICK C. WARNE AND ANDRUS B. McLEAN, OF MANSFIELD, OHIO, ASSIGNORS TO RODERICK LEAN MANUFACTURING COMPANY, OF MANSFIELD, OHIO, A CORPORATION OF NEW JERSEY.

HARROW.

958,200.

Specification of Letters Patent.

Patented May 17, 1910.

Application filed October 22, 1908. Serial No. 458,959.

*To all whom it may concern:*

Be it known that we, FREDERICK C. WARNE and ANDRUS B. McLEAN, citizens of the United States of America, residing at Mansfield, in the county of Richland and State of Ohio, have invented certain new and useful Improvements in Harrows, of which the following is a specification.

Our invention relates to low frame reversible and extension disk harrows and is especially adapted to be used for cultivating the soil under orange or other trees having low lying branches.

One of the objects of our invention is to provide a low frame disk harrow and means of pivotally connecting one or more gangs of disks to the frame.

Another object of our invention is to provide means of securing the gangs to the frame through the medium of an adjustable clamping device and links which provide for shifting the gangs laterally and also provides facilities for connecting the gangs to the frame so as to leave the cutting edges of the disks on a plane or at an inclination with the frame.

A further object is to provide means of pivotally connecting the disk gangs to the frame so that the connecting links will be substantially in line with the line of draft of the frame when the cutting edges of the disks of the gangs are set at an inclination to the line of draft of the frame.

A further object of our invention is to provide means of imparting movement to the disk gangs to force the disks to travel at a predetermined inclination to the line of draft of the frame or parallel therewith at the will of the operator.

In the drawings, Figure 1 represents a plan view of my device showing the disks connected to the harrow at an angle to the line of draft in full lines in what is designated " working position " and also in dotted lines the position of the disks with reference to the frame when they are set in position for transporting purposes. Fig. 2 is a side elevation partly in section of Fig. 1. Fig. 3 is a plan view of one of the links. Fig. 4 is a plan view of one of the brackets or frame blocks that is attached to the frame. Fig. 5 is an end view of one of the brackets or frame blocks that is attached to the frame. Fig. 6 is a side view of one of the coupling blocks. Fig. 7 is a plan view of one of the clamps. Fig. 8 is an enlarged plan view of the mechanism used to connect the disk gangs to the frame of the harrow. Fig. 9 is a side view of Fig. 8. Fig. 10 is a detail view of one of the link levers.

In the construction of my device, I prefer to construct the frame 1 as shown which is substantially triangular in shape. A pole or tongue 2 is interposed between the forward ends of the frame 1 and is securely clasped thereto by the bolt 3. The forwardly extending portion 4 of the pole has a foretruck 5 secured to its outer extremity as shown in Fig. 2. The rear portion of the pole 4' extends toward the rear of the frame and is attached to the cross-bar 5' of the frame in any ordinary manner.

Frame blocks 6 and 7 are slidably fitted to the cross-bar 5' of the frame and adjustably held in place through the medium of the clamps 8 and 9 and the bolts 8' and 9'. The contacting faces 10 and 11 of the clamps are serrated and adapted to engage with counterpart serrations 12 and 13 formed on the faces of the frame blocks for the purpose of providing a means of setting the disk gangs at a predetermined incline or on a plane with the frame 1.

The clamps and frame blocks are adapted to be shifted or adjusted laterally on the cross-bar 5' so as to bring them closer together or farther away from each other to permit the gangs, which are pivotally connected to the frame blocks, to travel and cultivate the soil adjacent to the trees or at different points between the rows. The gangs or series of disks 14 and 15 are mounted on shafts journaled in suitable bearings 16 and 17 to which are attached yokes 18 and 19. The free ends of the yokes 18 and 19 pass through apertures formed in the upwardly extending lugs 20 and 21 of the bearings and are secured thereto by the nuts 22, 22', 23, and 23'. Coupling blocks 24 and 25 having pockets formed therein are secured to the yokes through the medium of bolts 26, 27, 28 and 29. The coupling blocks are not secured directly in the center of the curved portion of the yoke but are located and attached as shown in Fig. 1 on one side of the center of the yokes or at such a point on the curved portion of the yokes as will bring the coupling links 30 and 31 substantially in line with the travel of the frame of the harrow when the disk gangs are set at an angle with the line of draft of the frame or in what is called the "working position." The coupling links are connected to the frame blocks 6 and 7 on one end and to the couplings blocks 24 and 25 on the other end. The ends of the links are nested in pockets formed in the frame and coupling blocks and the pivot bolts 32 and 33 pass through the ends of the coupling links and suitable apertures formed in the frame and coupling blocks thereby pivotally connecting the disk gangs to the frame.

Plates 34 and 35 are secured to the lower portion of the coupling blocks 24 and 25 by the pivot bolts 32 leaving the angular ends projecting toward the frame of the harrow when the disk gangs are coupled to the frame (see Fig. 8). Apertures are provided in the ends of the plates 34 and 35 and shifting bars 36 and 37 are pivotally attached thereto by the bolts 38 and 39. The shifting bars are provided with a series of apertures 40 and 41.

Link levers 42 and 43 having enlarged portions 44 and 45 (to provide a good bearing) are pivotally secured to the bottom of the pole adjacent to its rear extremity by the pivot bolt 46 with the annular washer 47 interposed between the link lever 43 and the under side of the pole. The link levers 42 and 43, when the disk gangs are in "working position" as shown in Fig. 1, cross each other in the form of a letter X leaving their extremities (which are provided with apertures) extending on opposite sides of the pole and pivot bolt 46.

The rearwardly extending extremities of the link levers are pivotally connected to the shifting bars 36 and 37 by the bolts 48 and 49 making a complete pivotal connection between the link levers and the disk gangs. Notched segment bars 50 and 51 are rigidly attached to each side of the pole by the bolts 52 and 53. Operating levers 54 and 55 having their lower ends 56 and 57 bent at an angle with the body portion, are pivotally attached to the pole leaving the upper portion contacting with the segments 50 and 51. The locking pawls 58 and 59 are secured to the levers and adapted to engage with the notches in the segment to provide for locking the levers at different points of their adjustment. Link bars 60 and 61 are provided and their ends are bent at right angles with the body portion and engage with apertures formed in the forward extremities of the link levers 42 and 43 and the ends 56 and 57 of the operating levers. The pawls are kept in engagement with the notched segment by the coil springs 62 and 63.

Through the medium of the above described mechanism, the operator of the harrow can without dismounting from the seat 64 impart movement to the disk gangs to throw them at an inclination to the line of draft or throw them so that they will travel parallel with the line of draft of the frame. The degree of inclination of the disk gangs with reference to the travel of the frame can be adjusted through the medium of the operating levers.

In Fig. 1, the disks are shown attached to the frame and set for what is designated an "out-throw", that is to say, that the cutting edges of the disks are at such an inclination with reference to the travel that the soil is thrown outwardly away from the trees. If, however, it is desired to set the gangs on the frame of the disk for an "in-throw" each of the disk gangs is disconnected from the frame and attached to the frame on the opposite side when it will be noted that the cutting edges of the disk will be operating in the reverse position.

Having fully described our invention, what we claim and desire to secure by Letters Patent is:

1. In a harrow, a frame, disk gangs, a pole connected to the frame, notched segments secured to said pole, operating levers pivotally connected to the pole, link levers secured to said pole, link bars to connect said link levers and operating levers, and means to pivotally connect said disk gangs to the link levers, as described and set forth.

2. In a harrow, the combination of a main frame and disk gangs; of yokes attached to said disk gangs, laterally adjustable and tilting frame blocks secured to the main frame, coupling blocks secured to the yokes, links pivotally connected to the frame blocks and coupling blocks and means to impart movement to the disk gangs at the will of the operator, as described and set forth.

3. In a harrow, a frame substantially triangular in shape, frame blocks secured to said frame and adapted to be laterally adjusted thereon, disk gangs, yokes secured to said disk gangs, coupling blocks secured to said yoke, links pivotally secured to said coupling blocks and frame blocks, substantially as and for the purpose described.

4. In a low frame harrow, a main frame substantially triangular in shape, frame blocks secured thereto, disk gangs, yokes secured to said gangs, coupling blocks secured to said yokes, links pivotally connected to said frame blocks and the coupling blocks whereby the disks can be made to travel at an inclination to the line of draft or parallel therewith, means secured to the main frame and connected to the yokes whereby movement can be imparted to the yokes and disks, substantially as and for the purpose set forth.

5. In a harrow, the combination of a main frame and disk gangs pivotally connected thereto, operating levers connected to said frame, link levers mounted on the lower part of the frame, link bars connecting said link levers and operating levers, yokes attached to the disk gangs, plates secured to the yokes, adjustable shifting bars pivotally connected to said plates and link levers whereby the disks are made to travel in line or at a predetermined inclination to the travel of the main frame at the will of the operator.

6. In a harrow, the combination of a main frame and disk gangs, connecting links to pivotally connect said disk gangs to the main frames; said links being pivotally connected on both ends, means interposed between the frame and gangs and connected to one end of the links and frame to provide for lateral adjustment and tilting of the gangs, operating levers secured to said frame, connecting means pivotally connecting said operating levers to the disk gangs whereby said disk gangs can be forced to travel at an angle to the line of draft or parallel therewith as described and set forth.

7. The combination of a harrow comprising a frame, disk gangs, yokes, links pivotally connecting said frame and yokes, link levers secured to the frame, plates secured to the yokes, shifting bars pivotally connected to said link levers and said plates, operating levers, means to connect said operating levers to said link levers whereby when movement is imparted to said operating levers the disks are forced to travel in or out of the line of draft.

In testimony whereof we affix our signatures in presence of two witnesses.

FREDERICK C. WARNE.
ANDRUS B. McLEAN.

Witnesses:
H. S. GUMP,
N. H. GLENDENNING.